Patented Jan. 21, 1930

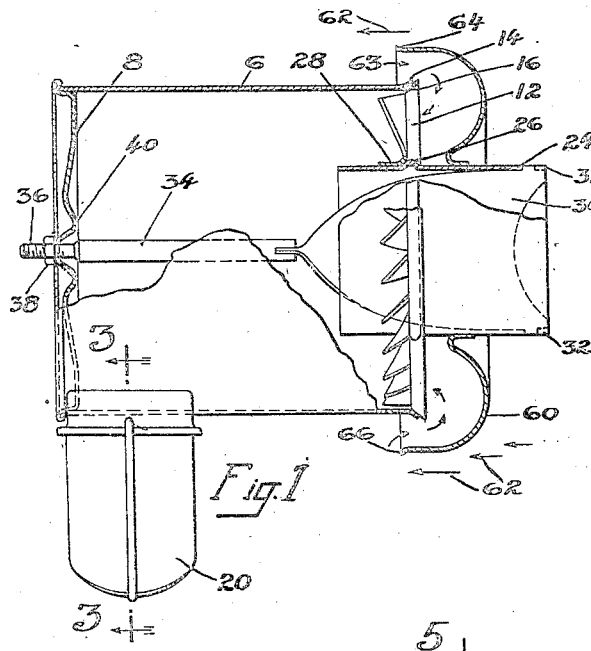

1,744,708

UNITED STATES PATENT OFFICE

HERBERT G. KAMRATH, OF FLINT, MICHIGAN, ASSIGNOR TO A C SPARK PLUG COMPANY, OF FLINT, MICHIGAN, A COMPANY OF MICHIGAN

AIR CLEANER

Application filed December 12, 1925. Serial No. 75,071.

The purpose of this application is to disclose improvements in air cleaners which serve to increase their efficiency and reduce the cost of manufacture.

Increase in efficiency is obtained by providing the cleaner with a device for effecting a preselection of relatively clean air for introduction into the cleaner. This preselection is achieved by facing the cleaner with its entrance port or opening toward an air current or blast such as that afforded by the customary cooling fan in the case of automobile engines or by the motion of the vehicle itself, and providing the entrance port with a baffle preventing the direct entrance of air and requiring that the air follow a circuitous course before entering the cleaner, thus eliminating large particles of grit and dust which, owing to their greater momentum, are unable to effect sharp changes in direction. This baffle is preferably so constructed as to prevent the gradual "creeping" of particles of dust around the edge thereof and into the cleaner. For this purpose I have provided the baffle with an outwardly flaring edge portion so that particles of dust following the outer surface of the baffle are projected into a fast moving portion of the air stream and are thereby carried away from the cleaner opening.

With the described construction the large particles of grit and dust are separated from the air stream before the air reaches the cleaner and the cleaner is rendered more effective in removing the remaining quantity of foreign particles.

I have also designed my air cleaner so that it may be cheaply manufactured from sheet metal. Thus my improved air cleaner which is of the general type disclosed in the application of Caleb E. Summers 754,007, filed Dec. 5, 1924, is preferably composed of a cylindrical casing member having a closed end and an open end, an annular air entrance port being provided in the open end of the casing surrounding a tubular member serving for the discharge of the purified air. These parts are so arranged as to be capable of being secured together by means of a single clamping device. It is around the tubular air discharge port that I have provided the annular baffle which, as before stated, serves to shield the air entrance port and thus increase the effectiveness of operation of my cleaner.

In the type of cleaner disclosed in the Summers' application, a dust receptacle is usually provided to receive the outer dust laden portions of the air stream. A minor feature of my invention consists in the provision of a baffle adjacent the opening through which the dust is discharged into the receptacle, this baffle serving to prevent the return of dust from the receptacle into the cleaner.

While I have pointed out the principal novel features of my invention, reference must be had to the following specification as well as to the claims for a complete exposition of the points in which my invention resides.

In the drawings:

Figure 1 is a side elevation, partly in section, showing my improved cleaner.

Figure 2 is a view looking at the right end of Figure 1, with parts of the baffle member broken away to better show the construction.

Figure 3 is a view on line 3—3 of Figure 1.

Figure 4 is a view corresponding to Figure 1 but showing a modified form.

Figure 5 is a view looking at the right end of Figure 4, with parts broken away.

Referring first to the form of invention shown in Figures 1 to 3, my air cleaner comprises a casing 6 having one end closed, preferably by means of a plate-like member 8, although, if desired, the casing member 6 may have an integrally formed end member. Air enters the casing 6 through openings 10 in an annular member 12, the member 12 and the casing 6 having inter-engaging stop means shown as comprising an outwardly turned flange 14 on the casing 6 which is engaged by a similar flange 16 formed on the member 12. The openings 10 are provided in the annular member 12 by cutting out and pressing inwardly portions 18 of the metal of the annular member, these portions being of substantially helical form and serving as air directing means to cause the air entering the casing to follow a spiral path thereby throwing the foreign particles against the inner surface of the casing along which they travel until ejected into the dust receptacle 20 through the dust discharge opening 22.

Within the annular member 12 is located a tubular member 24. The tubular member and the annular member are similarly provided with inter-engaging means to limit the movement of the tubular member inwardly of the casing. This inter-engaging means preferably comprises an outwardly pressed flange or bead 26 formed on the member 24 and engaging the inner periphery of the annular member. This portion of the annular member is preferably reenforced by a strengthening flange shown at 28 which also serves as a guide for the cylindrical member.

A common clamping means is provided to secure the plate-like member 8, casing 6, annular member 12, and tubular member 24 together in the order named. A portion of this clamping means indicated at 30 also serves as an air straightener. The portion 30 is preferably provided with tongues 32 which engage notches in the tubular member 24 while the other end of the clamping means is composed of a stem 34 secured to the straightener and having its extremity 36 threaded for the reception of a nut 38 by which the parts are clamped together. It will be noted that the plate-like member 8 is corrugated as at 40 so that it may better resist buckling strains when the parts are clamped together.

As previously stated, the dust laden portions of the air stream are ejected through the opening 22 into the dust receptacle 20. Referring to Figure 3 it will be noted that I have provided a fitting 40 between the dust receptacle and the casing. This fitting is provided with an opening 42 registering with the opening 22 in the casing, the opening 42 being formed by pressing downwardly a portion 44 of the metal of the fitting, this portion serving as a baffle to prevent the return of dust from the dust receptacle into the casing. It is obvious that the tongue or baffle 44 might be formed integral with the casing 22 instead of with the fitting or might constitute a separate member. At the lower portion of the fitting I have provided a shoulder 45 bounded by a flange 46, the two serving as a seat for the reception of a gasket 48 against which the upper edge 50 of the dust box 20 bears. A clamping device in the form of a bail 52 having journal portions 54 received in depressions 56 provided in the fitting 40 above the shoulder 44 serves to hold the dust receptacle to the fitting.

I have shown at 60 in Figure 1 the baffle which serves to afford a preselection of relatively clean air for introduction into the cleaner. This baffle is of annular form and is secured to the tubular member 24 by welding or the like. It overlies the openings 10 in the annular member 12 and effectively prevents the direct entrance of dust particles into the cleaner. I have indicated by the arrows 62 the direction of the stream of air supplied by the usual fan or by the motion of the vehicle. It will be noted that the air entering the cleaner from this stream must follow a circuitous path indicated by the small arrows 63. I also call attention to the outwardly flared portions 64 of the baffle. The purpose of this configuration is to prevent dust particles, such as indicated at 66, from creeping around the edge of the baffle into the casing as a consequence of eddy currents formed there. The flare serves to project the dust particles gathered on the baffle into swiftly moving portions of the air stream so that they are carried past the cleaner entrance.

While the operation of the cleaner is probably apparent from the foregoing description, it may be briefly stated as follows. The relatively clean air separated from coarser particles of dust and grit follow a circuitous path indicated by the small arrows 63 until it impinges against the spiral blades 18 which impart to it a whirling motion causing the remaining particles of foreign matter to hug the walls of the casing 6 until they are finally ejected through opening 22 into the dust box 20. Once there the baffle 44 serves to assist in preventing their return to the casing. The clean air on striking the plate-like member 8 reverses its direction and follows a spiral path backwardly into the tubular member 24 where the straightener 30 serves to facilitate the discharge of the air reducing the back pressure of the air stream.

The form of the invention shown in Figures 4 and 5 more closely follow the construction shown in the Summers' application. In this form the blades 70, the cone shaped portion 72, and the tubular member 74 comprise one die casting while the end member 76 with the downwardly opening dust box receiving portion 78 constitute a second die casting. These parts are held together by the combined air straightener and clamping device indicated at 80. The dust box 20 is secured to the portion 78 of the cleaner by a bail 52 as in the preceding form. In this modification is also illustrated the baffle 60 which here performs the same function as in the preferred form.

In both embodiments of the invention it may be desirable to seal the joints, particularly those at the closed end of the casing by means of a suitable composition, such as permatex, to secure air tightness.

I claim:

1. An air cleaner of the inertia type comprising a casing having an air inlet and air outlet, and means between said inlet and outlet for whirling the air in passing through said cleaner to effect a removal of dust particles from the air stream, said cleaner being arranged with its inlet facing an air stream, and a baffle for said inlet arranged to prevent the direct entrance of air currents into the cleaner thus effecting a preselection of relatively clean air.

2. In an air cleaner comprising a casing having a closed end and an open end, a tubular air discharge port arranged in said open end, air directing means positioned between said port and the walls of the casing, and a baffle surrounding said port and shielding said air directing means against the direct entrance of air currents.

3. The structure as defined in claim 2, said baffle being provided with an outwardly flaring outer marginal portion.

4. In an air cleaner of the type in which a casing is provided through which the air is circulated, said casing having a port for the discharge of dust separated from the air stream, a fitting secured to the casing adjacent said port, said fitting being provided with a shoulder and an annular flange, a gasket seated on said shoulder within the confines of said flange, and a dust receptacle secured to said fitting and engaging said gasket to form a substantially air tight joint.

5. In an air cleaner of the type in which a casing is provided through which the air is circulated, said casing having a port for the discharge of dust separated from the air stream, a fitting secured to the casing adjacent said port, said fitting being provided with an aperture in line with the port in the casing, and with a flanged portion for receiving a gasket, a gasket on said flanged portion, a dust receptacle adapted to have its upper edge engage the gasket, and means for securing the dust receptacle in position.

6. The structure as defined in claim 5, said last named means comprising a swing bail having journal portions, said fitting being provided with seats for said journal portions directly above said flange.

7. An air cleaner comprising a casing member having a closed end and an open end, an annular member within said open end apertured for the passage of air, inter-engaging stop means on said casing and member limiting the movement of said member inwardly of the casing, a tubular member arranged within said annular member, inter-engaging stop means on said tubular member and said annular member for limiting the inward movement of the tubular member with respect to the annular member, and means for securing said parts in assembled relation.

8. In the structure as defined by claim 7, said last named means comprising a clamping device engaging said tubular member and the closed wall of the casing.

9. The structure as defined by claim 7, said first named inter-engaging stop means comprising an outwardly turned flange on said casing, and a correspondingly outwardly turned portion on said annular member.

10. The structure as defined by claim 7, said second named inter-engaging stop means comprising an outwardly pressed portion on said tubular member engaging the adjacent margin of said annular member.

11. In the combination as defined by claim 7, said casing member comprising a tubular portion and a plate-like member for closing one end of the tubular portion.

12. An air cleaner comprising a tubular casing, a closure for one end of said casing having an aperture therein, an annular member arranged in the other end of said casing and apertured for the passage of air, inter-engaging stop means on said casing and said annular member limiting the movement of said annular member inwardly of the casing, a tubular member arranged within the annular member, inter-engaging stop means on said tubular member and said annular member for limiting the inward movement of the tubular member with respect to the said annular member, and a clamping device engaging said tubular member and passing through the aperture in said closure for drawing said parts together and holding them in assembled relation.

13. In the combination as set forth in claim 12, said clamping means comprising an air straightener portion positioned within the tubular member.

14. An air cleaner comprising a cylindrical casing, a web of sheet metal extending across one end of the casing and shaped to provide an annular series of substantially radially extending helical blades for imparting to the entering air a whirling motion along the casing axis, said casing being provided with an axial clean air outlet, and with a peripheral dust discharge port at the end opposite the blades, and an air straightener arranged adjacent said outlet for removing the whirl from the outgoing air.

15. An air cleaner comprising a cylindrical casing, a web of sheet metal extending across one end of the casing and shaped to provide an annular series of substantially radially extending helical blades for imparting to the entering air a whirling motion along the casing axis, said casing being provided with an axial clean air outlet, and with a peripheral dust discharge port at the end opposite the blades, said casing being outwardly flared at its open end and said web being provided with a flang portion cooperating with said flared portion of the casing to position the web therein.

16. An air cleaner comprising a cup-shaped casing having a closed end and an open end, and provided at the open end with a transversely extending web of sheet metal formed to provide a series of substantially radially extending helical blades for imparting to the entering air a whirling motion along the casing axis, said casing being provided adjacent the closed end and remote from its axis with a dust discharge slot, and a clean air outlet tube communicating with the interior of the casing along its axis, and an air straightener connected to the closed end of the casing and cooperating with the outlet to remove whirl from the outgoing air.

17. An air cleaner comprising a cylindrical casing having a closed end and an open end, an annular member arranged adjacent the open end of the casing and engaging the inner walls thereof, said annular member being formed with a series of integral substantially radially extending pressed-out helical air directing blades adapted to impart to the entering air stream a whirling motion along the casing axis, and a tubular member arranged within said annular member and serving for the discharge of the purified air, and means for securing said parts in position, said casing being provided with a dust discharge aperture adjacent the closed end thereof, a dust receptacle secured over the aperture, and a baffle underlying said aperture to prevent the return of dust from the receptacle back into the casing.

In testimony whereof I affix my signature.

HERBERT G. KAMRATH.